(12) United States Patent
Seki et al.

(10) Patent No.: US 9,045,860 B2
(45) Date of Patent: Jun. 2, 2015

(54) SHEET MANUFACTURING APPARATUS

(71) Applicant: SEIKO EPSON CORPORATION, Tokyo (JP)

(72) Inventors: Shunichi Seki, Nagano (JP); Toshiaki Yamagami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/223,063

(22) Filed: Mar. 24, 2014

(65) Prior Publication Data

US 2014/0290890 A1    Oct. 2, 2014

(30) Foreign Application Priority Data

Mar. 27, 2013    (JP) .................................. 2013-065809
Feb. 13, 2014    (JP) .................................. 2014-025124

(51) Int. Cl.
*D21D 1/30*    (2006.01)
*D21F 9/00*    (2006.01)
*B03C 1/033*    (2006.01)
*B03C 1/26*    (2006.01)

(52) U.S. Cl.
CPC ............... *D21F 9/00* (2013.01); *B03C 1/0332* (2013.01); *B03C 1/26* (2013.01); *B03C 2201/20* (2013.01)

(58) Field of Classification Search
USPC ....................................... 162/261, 4
See application file for complete search history.

(56) References Cited

U.S. PATENT DOCUMENTS

| | | | | |
|---|---|---|---|---|
| 3,741,863 A * | 6/1973 | Brooks | ............................. | 162/4 |
| 4,079,837 A * | 3/1978 | Grube et al. | ................... | 209/17 |
| 4,176,054 A * | 11/1979 | Kelley | ................ | 209/8 |
| 6,260,777 B1 * | 7/2001 | Seppanen | ...................... | 241/19 |
| 6,306,248 B1 * | 10/2001 | Eley | ................... | 162/4 |
| 2014/0027075 A1 * | 1/2014 | Yamagami et al. | .............. | 162/4 |

FOREIGN PATENT DOCUMENTS

EP    2664708 A1    11/2013
JP    2012-144819 A    8/2012

OTHER PUBLICATIONS

JP-2011-005573, Yamagami et al., Feb. 2012.*

* cited by examiner

*Primary Examiner* — Mark Halpern
(74) *Attorney, Agent, or Firm* — Global IP Counselors, LLP (57) ABSTRACT

A sheet manufacturing apparatus includes a defibrating unit configured to defibrate stock material in a dry process, a transferring tube configured to transfer the stock material to the defibrating unit, and a magnet unit arranged such that a magnetic surface is exposed an inside of the transferring tube without being protruded inner than an inner surface of the transferring tube.

9 Claims, 8 Drawing Sheets

SHEET MANUFACTURING APPARATUS

CROSS-REFERENCE TO RELATED APPLICATIONS

This application claims priority to Japanese Patent Application No. 2013-065809 filed on Mar. 27, 2013 and Japanese Patent Application No. 2014-025124 filed on Feb. 13, 2014. The entire disclosure of Japanese Patent Application Nos. 2013-065809 and 2014-025124 is hereby incorporated herein by reference.

BACKGROUND

1. Technical Field

The present invention relates to a sheet manufacturing apparatus.

2. Related Art

A wet-type sheet manufacturing apparatus for producing a sheet such as paper using water is known. Since a wet-type sheet manufacturing apparatus consumes a large amount of water, a dry-type sheet manufacturing apparatus which consumes almost no water is proposed (see Japanese Unexamined Laid-open Patent Application Publication No. 2012-144819). In a dry-type sheet manufacturing apparatus, the sheet production is performed via a dry-type defibration step in which used paper is defibrated in air into a fibrous form by a Turbo-Mille, etc.

In some cases, however, metallic foreign substances, such as clips and staplers, are contained in stock material such as used paper. In a dry-type defibration, used paper, etc., is made into a fibrous form by rotating rotary blades. There were problems that, during the defibration step, metallic foreign substances caused deterioration of blades and/or caused abnormal noise. These are problems which never occur in a wet-type sheet manufacturing apparatus which preforms defibration in water.

SUMMARY

The present invention was made to solve at least a part of the aforementioned problems, and is capable of being realized as the following embodiments or applied examples.

A sheet manufacturing apparatus according to this applied example includes a defibrating unit configured to defibrate stock material in a dry process, a transferring tube configured to transfer the stock material to the defibrating unit, and a magnet unit arranged such that a magnetic surface is exposed to an inside of the transferring tube without being protruded inner than an inner surface of the transferring tube.

With this structure, the magnet unit is arranged at the transferring tube through with stock material is transferred to the defibrating unit. Therefore, when metallic foreign substances such as clips, staplers, etc., are mixed and transferred together with stock material, these metallic foreign substances can be absorbed by the magnet unit and becomes removable. Further, the magnetic surface of the magnet unit is arranged so as to not protrude inside the transferring tube. For this reason, there exists no resistance portion in the transferring tube, which can stably supply stock material to the defibrating unit.

The magnet unit of the sheet manufacturing apparatus according to the aforementioned applied example includes a plurality of magnets arranged in a circumferential direction of the transferring tube.

With this structure, by arranging a plurality of magnets along the periphery of the transferring tube, the magnetic force crosses the inside of the transferring tube, which can impart a magnetic force in the transferring tube.

In the sheet manufacturing apparatus according to the aforementioned applied example, a plurality of the magnets are arranged such that magnetic poles different in polarity are opposed with each other.

With this structure, it is possible to effectively impart a magnetic force to the inside of the transferring tube.

In the sheet manufacturing apparatus according to the aforementioned applied example, the plurality of the magnets are arranged such that magnetic poles different in polarity are arranged in the circumferential direction.

With this structure, it is possible to effectively impart a magnetic force to the inside of the transferring tube.

In the sheet manufacturing apparatus according to the aforementioned applied example, the plurality of the magnets are arranged in a transferring direction of the stock material in the transferring tube.

With this structure, the distance for absorbing metallic foreign substances, etc., by the plurality of magnets increases, which can enhance collection efficiency of metallic foreign substances.

In the sheet manufacturing apparatus according to the aforementioned applied example, the magnet unit is attachable to and detachable from the transferring tube.

With this structure, metallic foreign substances, etc., absorbed to the magnet unit can be easily removed.

In the sheet manufacturing apparatus according to the aforementioned applied example, the magnet unit and a portion of the transferring tube is detachable from another portion of the transferring tube.

With this structure, by removing the magnet unit and the transferring tube together, metallic foreign substances, etc., absorbed to the magnet unit can be easily removed. Further, the attachment and detachment of the magnet unit to and from the transferring tube can be easily performed.

In the sheet manufacturing apparatus according to the aforementioned applied example, the magnetic surface of the magnet unit is flush with the inner surface of the transferring tube.

With this structure, since there exists no resistance portion in the transferring tube, stock material can be stably supplied to the defibrating unit.

In the sheet manufacturing apparatus according to the aforementioned applied example, the magnetic surface of the magnet unit is positioned outer than the inner surface of the transferring tube.

With this structure, since there exists no resistance portion in the transferring tube, stock material can be stably supplied to the defibrating unit. Further, the apparatus can be easily formed and the cost can be reduced.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, embodiments of the present invention will be explained with reference to figures. In each of the following figures, the scale of each member, etc., is shown so as to be different from the actual scale to make each member, etc., recognizable size.

Initially, the structure of the sheet manufacturing apparatus will be explained. This sheet manufacturing apparatus is based on a technology for reproducing stock material into a new sheet. The stock material to be supplied to the sheet manufacturing apparatus according to this embodiment can be, for example, beside used papers of the mainstream size in offices, films and/or fabrics to which clips or staplers can be applied. Hereinafter, concrete examples will be explained.

First Embodiment

Figure 1:
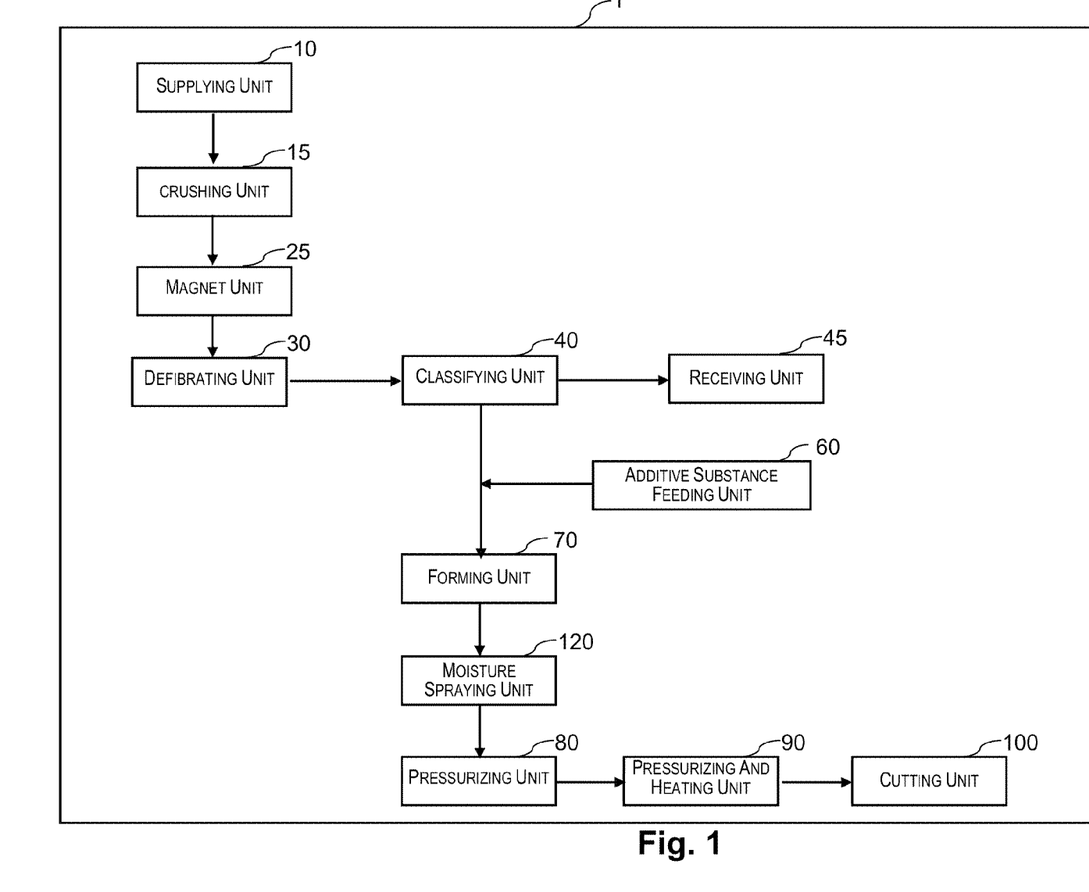
FIG. 1 is a schematic drawing showing a structure of a sheet manufacturing apparatus.
Figure 2:
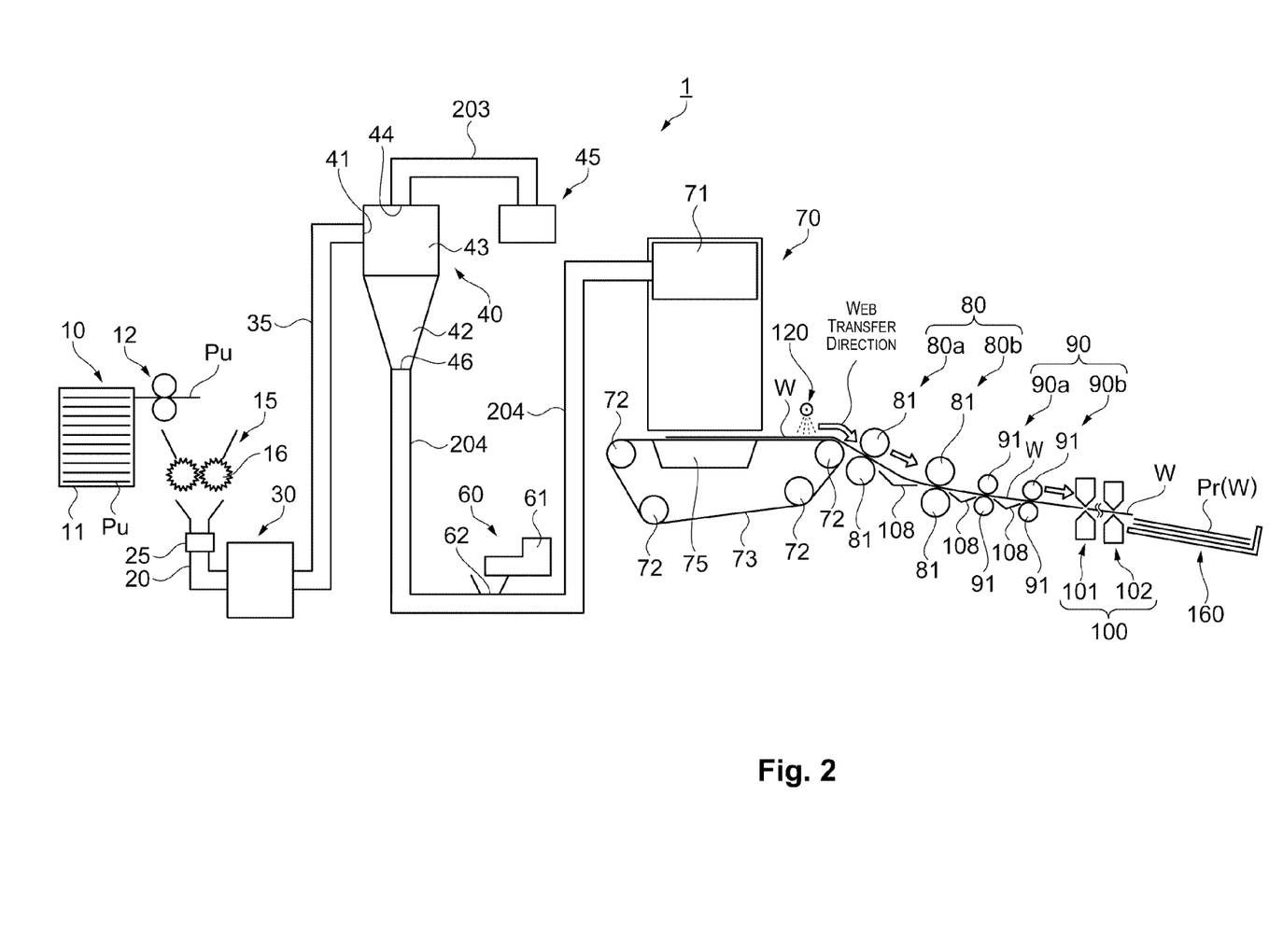
FIG. 2 is another schematic drawing showing a structure of the sheet manufacturing apparatus.

FIGS. 1 and 2 are schematic drawings showing the structure of a sheet manufacturing apparatus. As shown in FIGS. 1 and 2, the sheet manufacturing apparatus 1 is provided with a supplying unit 10, a crushing unit 15, a defibrating unit 30, a classifying unit 40, a receiving unit 45, an additive substance feeding unit 60, a forming unit 70, a moisture spraying unit 120, a pressurizing unit 80, a pressurizing and heating unit 90, and a cutting unit 100. Further, a magnet unit 25 is provided at a transferring tube 20 for transferring stock material to the defibrating unit 30.

The supplying unit 10 supplies stock material Pu as a defibration object to the crushing unit 15. The supplying unit 10 is provided with a tray 11 for loading plural sheets of stock material Pu thereon in a stacked manner, an automatic feeder 12 capable of continuously feeding the stock material Pu loaded on the tray 11 to the crushing unit 15, etc.

The crushing unit 15 is configured to cut the supplied stock material Pu into small square pieces of several centimeters. The crushing unit 15 is provided with a crushing blade 16, constituting a device including a shredding blade having a width wider than a width of a normal shredder. With this, the supplied stock material Pu can be easily cut into small pieces. The cut small pieces are supplied to the defibrating unit 30.

The defibrating unit 30 is provided with a rotatable rotary blade, and is configured to defibrate the small pieces supplied from the crushing unit 15 into a fibrous (cotton-like) form (defibrating process) and discharge the defibrated material from the discharge port to the classifying unit 40. The defibrating unit 30 of this embodiment performs a dry-type defibrating operation to be performed not in water but in air. In the defibrating unit 30, a dry-type defibrating apparatus equipped with, for example, a disk refiner, a Turbo-Mill (made by Turbo Kogyo Co., Ltd.), a Ceren-Miller (made by Masuko Sangyo Co., Ltd), and/or a wind generation mechanism can be arbitrarily applied. The size of small piece to be introduced to the dry-type defibrating unit 30 can be a size similar to a size of a piece discharged from a normal shredder.

By the defibrating processing by the defibrating unit 30, coating materials, such as, e.g., printed ink, tonner, or blot inhibitor, will be also released from the state in which they are adhered to fibers (hereinafter referred to as "ink particle"). Therefore, the defibrated material discharged from the defibrating unit 30 contain fibers and ink particles obtained by defibrating the small pieces. The defibrating unit 30 of this embodiment has a mechanism in which airflow is generated by the rotation of the rotary blade, and the defibrated material is transferred to the classifying unit 40 through a transferring tube 35 by being carried by the airflow.

In the case of using a dry-type defibrating portion 30 not equipped with a wind generation mechanism, it is recommended to separately provide an airflow generator for generating airflow from the crushing unit 15 toward the defibrating portion 30.

The classifying unit 40 is to separate the transferred defibrated material into ink particles and fibers to remove the ink particles. In the classifying unit 40 of this embodiment, a cyclone 40 is employed as the classifying unit 40. A cyclone 40 of a tangent input type is relatively simple in structure and therefore preferable, but an airflow-type classifier of another type can be used in place of the cyclone 40. In this case, as an airflow-type classifier other than the cyclone 40, for example, an Elbow-Jet, an EID classifier, etc., can be used. An airflow-type classifier generates swirling airflow to perform separation and classification by the difference of the received centrifugal force due to the size and density of the defibrated material, and can adjust the classification point by adjusting the airflow velocity and/or the centrifugal force.

The cyclone 40 of this embodiment is constituted by an inlet port 41 for introducing from the defibrating unit 30, a cylindrical portion 43 to which the inlet port 41 is connected in a tangential direction, a conical portion 42 continued from the cylindrical portion 43, a lower outlet 46 provided at the lower portion of the conical portion, and an upper exhaust port 44 provided at the upper central portion of the cylindrical portion 43 to discharge fine powder.

In the classification processing, the airflow carrying defibrated material introduced from the inlet port 41 of the cyclone 40 is changed into a circular movement at the cylindrical portion 43 and then moved to the conical portion 42. Depending on the difference of the centrifugal force received by the size and the density of the defibrated material, separation and classification are performed.

When classifying the substances contained in the defibrated material into two types, fibers and ink particles other than fibers, fibers are larger in size or higher in density than ink particles. For this reason, the defibrated material is separated into ink particles smaller in size and lower in density than fibers and fibers larger in size and higher in density than ink particles by the classification processing. The ink particles relatively low in density and small in size are discharged from the upper exhaust port 44. The discharged ink particles passes through the piping 203 via the upper exhaust port 44 of the cyclone 40 and are collected by the receiving unit 45. On the other hand, fibers lager in size and higher in density than ink particles are transferred as defibrated fibers from the lower outlet 46 of the cyclone 40 toward the forming unit 70.

In the middle of the piping 204 through which defibrated fibers are transferred from the cyclone 40 to the forming unit 70, the additive substance feeding unit 60 for adding an additive substance to defibrated fibers is provided. As an additive substance, for example, fusion-bondable resin, fire retardant, whiteness enhancer, paper strengthening agent, sizing agent, etc., can be exemplified. A part or all of these additive substances can be eliminated, or another additive substance can be supplied. The additive substance is stored in the storing portion 61, and fed from the feeding port 62 by a non-illustrated feeding mechanism.

Materials in which a fusion-bondable resin and/or an additive agent are fed to defibrated fibers transferred from the cyclone 40 in the middle of the piping 204 are called "material fibers." In the sheet manufacturing apparatus 1, a sheet is formed using material fibers.

The forming unit 70 is configured to deposit the material fibers to have an even thickness. The forming unit 70 is provided with a porous screen having a plurality of small holes, and a forming drum 71 as a screen portion for depositing material fibers as a material passed through the porous screen. The forming unit 70 includes a mechanism for evenly dispersing the material fibers in the air and a mechanism for sucking the dispersed material fibers on the mesh belt.

Initially, as a mechanism for evenly dispersing the material fibers in the air, in the forming unit 70, a forming drum 71 into which the material fibers are fed is arranged. By rotating the forming drum 71, additive substances can be evenly mixed in the fibers. On the surface of the forming drum 71, a porous screen is provided. By rotatably driving the forming drum 71, the material fibers pass through the porous screen, which enables even dispersion of the material fibers in the air.

On the other hand, vertically down below the forming drum 71, an endless mesh belt 73 in which a mesh is formed is arranged. The mesh belt 73 is tensioned by a plurality of stretching rollers 72, and is configured to move the mesh belt 73 in one direction by rotating at least one of the stretching rollers 72.

Further, vertically down below the forming drum 71, a suction apparatus 75 for generating airflow vertically downward is provided via the mesh belt 73. By the suction apparatus 75, the material fibers dispersed in the air can be sucked on the mesh belt 73.

When the material fibers are introduced into the forming drum of the forming unit 70, the material fibers pass through the porous screen on the surface of the forming drum 71 and are deposited on the mesh belt 73 by the suction power of the suction apparatus 75. At this time, by moving the mesh belt 73 in one direction, the material fibers can be deposited with a uniform thickness. The accumulated deposit containing the material fibers is called web W. The mesh belt 73 can be made of metal, resin, or nonwoven fabric, and can be any member as long as it allows deposition of material fibers and also allows passage of airflow. If the aperture diameter of the mesh is too large, when forming a sheet, unevenness is easily formed on the surface of the sheet. If the aperture diameter of the mesh is too small, it becomes hard to attain stable airflow by the suction apparatus 75. For this reason, it is preferable to appropriately adjust the aperture diameter of the mesh. The suction apparatus 75 can be formed by forming a sealed box having an opening of a desired size below the mesh belt 73 and sucking the air in the box from a portion other than the opening to vacuum the inside of the box to cause a rough vacuum or a negative pressure state.

The web W is transferred in the web transfer direction shown by the arrow in FIG. 2 by moving the mesh belt 73. The moisture spraying unit 120 is to spray moisture toward the web W to be transferred. With this, hydrogen bonding between fibers can be enhanced. The web W to which moisture was sprayed is transferred to the pressurizing unit 80.

The pressurizing unit 80 is to pressurize the transferred web W. The pressurizing unit 80 is provided with two pairs of pressurizing rollers 81. By making the web W to which moisture was sprayed pass through between the opposed pressure rollers 81, the web W is compressed. The compressed web W is transferred to the pressurizing and heating unit 90.

The pressurizing and heating unit 90 simultaneously performs pressurizing and heating of the transferred web W. The pressurizing and heating unit 90 is provided with two pairs of heating rollers 91. By making the compressed web W pass through between the opposed heating rollers 91, the web is heated and pressurized.

In a state in which the distance between fibers is shortened and the number of contacts between fibers is increased by the pressure rollers 81, the fusion-bondable resin is molten by the heating rollers 91 to connect fibers with each other. This enhances the strength as a sheet and dehydrates to remove excessive moisture, enabling a production of an excellent sheet. The heating is preferably performed by arranging heaters in the heating rollers 91 to simultaneously perform pressurizing and heating of the web W. Below the pressure rollers 81 and the heating rollers 91, guides 108 for guiding the web W are arranged.

The web W obtained as mentioned above is transferred to the cutting unit 100. The cutting unit 100 is provided with a cutter 101 for cutting the web in the transfer direction and a cutter 102 for cutting the web in a direction perpendicular to the transfer direction, so that the web W formed in an elongated manner is cut into a desired size. The cut web W is stacked as sheets Pr on the stacker 160.

Figure 3A:
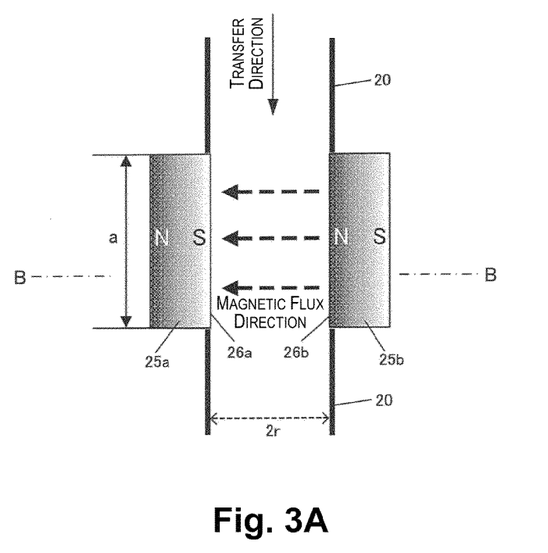
FIG. 3A is a schematic drawing showing a structure of a magnet unit.
Figure 3B:
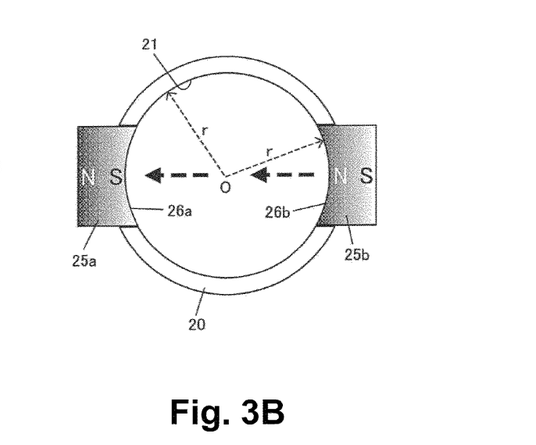
FIG. 3B is the schematic drawing showing the structure of the magnet unit.

Here, the structure of the magnet unit 25 according to this embodiment will be explained. The magnet unit 25 of this embodiment is arranged at the transferring tube 20 which connects the crushing unit 15 and the defibrating unit 30. FIGS. 3A and 3B are schematic drawings showing the structure of the magnetic unit. FIG. 3A is a vertical cross-sectional view of the transferring tube 20. FIG. 3B is a horizontal cross-sectional view (cross-sectional view taken along the line B-B in FIG. 3A) of the transferring tube 20. As shown by the arrow in FIG. 3A, a transferring direction is defined by a direction along the extending direction of the straight transferring tube 20 which is a direction along which the small pieces of stock material Pu are transferred.

In this embodiment, two magnet units 25a and 25b are arranged so as to face both wall sides in a direction perpendicular to the transferring direction of the transferring tube 20. In other words, the two magnet units 25a and 25b are arranged in a circumferential direction along the periphery of the transferring tube 20. Each magnet unit 25a and 25b is constituted by a bar-shaped permanent magnet. The magnetic surface 26a and 26b of each magnet unit 25a and 25b is arranged so as to not protrude inner than the inner surface 21 of the transferring tube 20. Further, each magnet unit 25a and 25b is arranged so as to be exposed to the inside of the transferring tube 20. In the transferring tube 20, openings corresponding to the shapes of the magnet units 25a and 25b are formed, and the magnet units 25a and 25b are fitted in the openings.

Since the magnetic surfaces 26a and 26b are exposed to the inside of the transferring tube 20 as mentioned above, magnetic flux is effectively exerted at the inside of the transferring tube 20, which enables effective collection of metal pieces. Further, since the magnet units 25a and 25b are exposed at the inside of the transferring tube 20, metal pieces which are being transferred can be absorbed by the magnet unit 25a and 25b. In this embodiment, although a permanent magnet is used to absorb metal pieces, it is possible to use an electric magnet to absorb metal pieces. In the case of using an electric magnet, by electrically controlling the electric magnet, it becomes possible to control absorption and non-absorption of metal pieces.

In this embodiment, when arranged at the transferring tube 20, each magnet unit 25a and 25b is arranged so that the N-pole of the magnet unit 25b and the S-pole of the magnet unit 25a face toward the inner space of the transferring tube 20. In other words, each magnet unit 25a and 25b are arranged with opposite magnetic poles facing with each other. By facing opposite magnetic poles with each other, each magnet unit 25a and 25b forms flux which penetrates in the transferring tube 20 from the magnet unit 25b to the magnet unit 25a. As explained above, in this embodiment, since two magnet units 25a and 25b are arranged as a pair so as to face with each other at both walls of the inner wall of the transferring tube 20, flux can be generated at the center of the transferring tube 20 and the vicinity thereof, enabling effective collection of metal pieces which are being transferred. When seen in the circumferential direction of the transferring tube 20, each magnet unit 25a and 25b is arranged so that the N-pole of the magnet unit 25b and the S-pole of the magnet unit 25a are arranged along the circumferential direction. In other words, magnetic poles different in polarity of a plurality of magnets are arranged in the circumferential direction. Further, when arranged at the transferring tube 20, each magnet unit 25a and 25b is arranged such that the N-pole and the S-pole are arranged so that flux extends in a direction (direction perpendicular to the transfer direction) toward the center of the transferring tube 20 from each magnet unit 25a and 25b.

Further, in order to effectively collect metal pieces, it is preferable that the length "a" of each magnet unit 25a and 25b in the transferring direction is set to be longer than the radius "r" of the transferring tube 20 (air). This causes the flux to act on the metal pieces which are being transferred in the tube, which improves probability of collecting metal pieces by the magnetic surfaces 26a and 26b.

Further, as shown in FIG. 3B, each magnet unit 25a and 25b is formed to have a shape in which the magnetic surface 26a and 26b exposed in the transferring tube 20 is flush with the inner surface 21 thereof. Here, the wording of "flush with" means that, as shown in FIG. 3B, there is no step or almost no step between the magnetic surface 26a and 26b of the magnet unit 25a and 25b and the inner surface 21 of the transferring tube. Further, it is preferable that the magnetic surface 26a and 26b is smoothly connected to the inner surface 21 of the transferring tube. In the transferring tube 20 of this embodiment, the inner portion thereof is formed into a round shape having a radius r, and the magnetic surface 26a and 26b is also formed into an arc shape having a radius r. Thus, an inner surface having a radius r is maintained.

For example, in cases where magnet units 25a and 25b are arranged at the transferring tube 20 with the magnet units projected toward the tube center from the inner surface 21 of the transferring tube to cause resistance portion of the transferring force, in some cases, turbulent flow and/or pulsating flow may be generated. There is a possibility that such turbulent flow or pulsating flow may cause heavy fluctuation of the supplied amount of small pieces. The fluctuation of the supplied amount provides cause of unevenness of a sheet to be produced, resulting in deteriorated quality. Further, the fluctuation of the supplied amount also provides cause of clogging in the forming drum 71, etc.

For this reason, in this embodiment, the magnetic surfaces 26a and 26b are arranged to be flush with the inner surface 21 of the transferring tube to control generation of resistance components, which controls fluctuation of the supplied amount of the materials of a sheet to thereby improve the quality of the sheet. Further, as shown in FIG. 3B, the inner cross-sectional shape of the transferring tube 20 at the positions where the magnet units 25a and 25b are arranged is formed into the same or approximately the same as the inner cross-sectional shape of the transferring tube 20 at the position where no magnet units 25a and 25b are arranged, which enables effective control of generation of turbulent flow and/or pulsating flow.

Figure 4A:
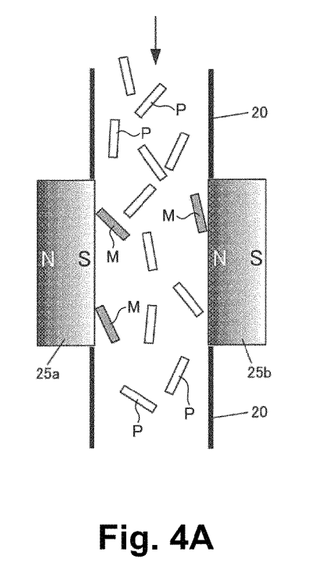
FIG. 4A is a schematic drawing showing another structure of the magnet unit.
Figure 4B:
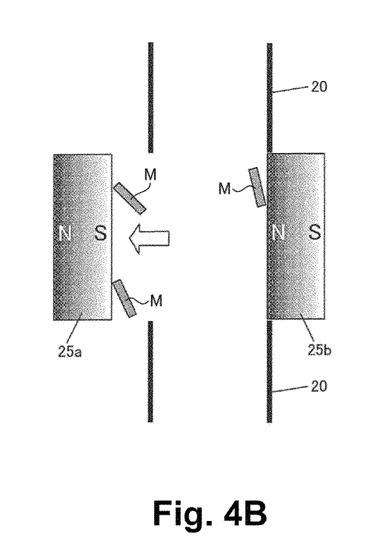
FIG. 4B is the schematic drawing showing another structure of the magnet unit.

At the sheet manufacturing step, the metal pieces absorbed by the magnet units 25a and 25b should be removed to maintain the collection efficiency of metal. FIGS. 4A and 4B show the state of attaching/detaching the magnet unit 25a to/from the transferring tube 20 at the time of removing metal pieces M absorbed by the magnet unit 25a. FIG. 4A shows the state of the production step by the sheet manufacturing apparatus. At the production step, small pieces P and metal pieces M are transferred along the transferring direction. At that time, metal pieces M is caught by the flux formed by the magnet units 25a and 25b to be absorbed either one of the magnet units 25a and 25b.

FIG. 4B shows the state of removing metal pieces M absorbed by the magnet unit 25a. In this embodiment, the magnet unit 25a is detachable from the transferring tube 20. The magnet unit 25a is detached to remove the metal pieces M absorbing to the magnetic surface 26a. After removing the metal pieces M, the magnet unit 25a is attached to the transferring tube 20 to maintain the collection efficiency of metal at the subsequent sheet manufacturing step. As to the magnet unit 25b, in the same manner as mentioned above, by detachably attaching the magnet unit 25b to the transferring tube 20, it becomes possible to remove absorbed metal pieces M.

Figure 5A:
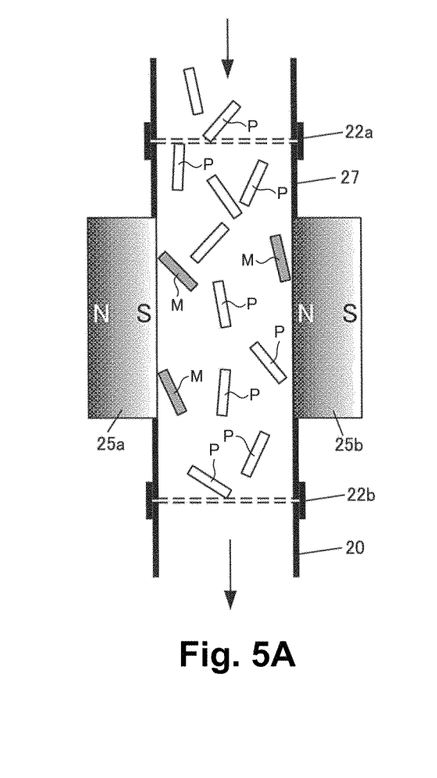
FIG. 5A is a schematic drawing showing another structure of the magnet unit.
Figure 5B:
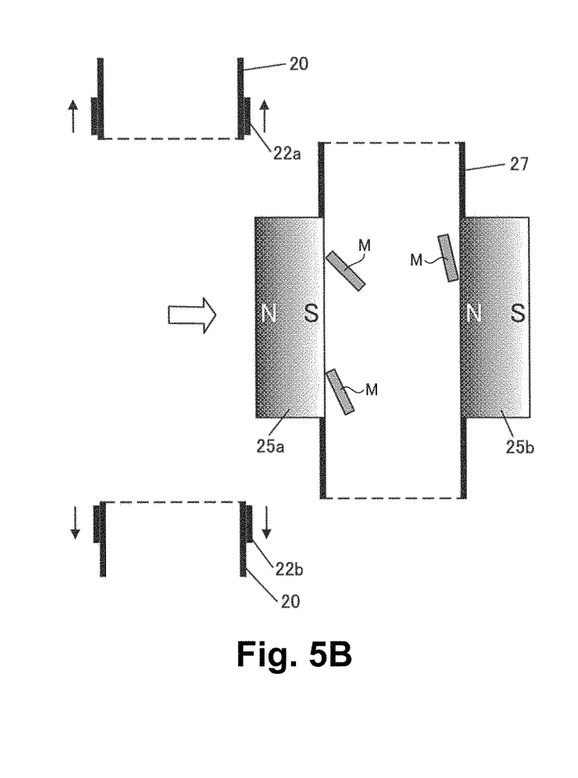
FIG. 5B is the schematic drawing showing another structure of the magnet unit.

FIGS. 5A and 5B show the state of attaching/detaching magnet units according to/from another embodiment. In FIG. 5A, the state of the production step by a sheet manufacturing apparatus 1 is shown. In FIG. 5B, the state of removing metal pieces M absorbed to the magnet units 25a and 25b is shown. In this embodiment, a part of the transferring tube 20 is constituted by a detachable magnet unit fixing tube 27, and the magnet units 25a and 25b are preliminarily fixed to the magnet unit fixing tube 27. The fixing state of the magnet units 25a and 25b and the magnet unit fixing tube 27 is similar to the state of arranging the magnet units 25a and 25b explained with reference to FIG. 3B, and therefore the explanation is omitted.

The magnet unit fixing tube 27 is fixed to the transferring tube 20 by two fixing portions 22a and 22b. By sliding the fixing portions 22a and 22b upward and downward respectively as shown in FIG. 5B, the magnet unit fixing tube 27 can be removed, which in turn can remove metal pieces M absorbed inside.

As explained above, in this embodiment, the magnetic surfaces 26a and 26b of the magnet units 25a and 25b are arranged so as to be exposed inside the transferring tube 20, and the magnetic surface 26a and 26b are formed into a shape flush with the inner surface of the transferring tube 20. This enables effective collection of metal (metal pieces M) and control of generation of resistance component in the tube, controlling the fluctuation of the supplied amount of material, which in turn can improve the quality of the sheet to be formed. Further, as explained with reference to FIGS. 4A, 4B, 5A, and 5B, the magnet units 25a and 25b themselves or the magnet unit fixing tube 27 to which the magnet units 25a and 25b are fixed are detachably attached, and therefore metal pieces M absorbed to the magnetic surface 26a and 26b can be easily removed.

As to the arrangement of the magnet units, various modifications can be employed. Using FIGS. 6 to 11, various embodiments relating to the arrangement of the magnet units will be explained.

Second Embodiment

Figure 6A:
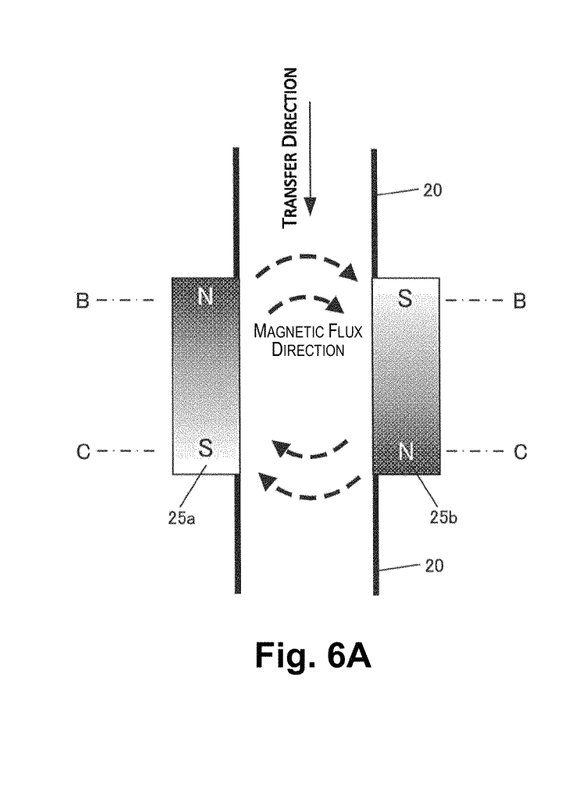
FIG. 6A is a schematic drawing showing another structure of the magnet unit.

In the embodiment of the magnet unit arrangement in FIGS. 6A, 6B, and 6C, magnet unit 25a and 25b are arranged so that the polarity of magnetic poles changes in the transferring direction of the transferring tube 20, while the magnet unit 25a and 25b explained with reference to FIGS. 3A and 3B are arranged so that the polarity of magnetic poles changes in a direction perpendicular to the transferring direction. FIG. 6A shows a vertical cross-sectional view of the transferring tube 20, FIG. 6B shows a horizontal cross-sectional view (cross-sectional view taken along the line B-B in FIG. 6A) of the transferring tube 20, and FIG. 6C shows a horizontal cross-sectional view of the transferring tube 20 (cross-sectional view taken along the line C-C in FIG. 6A).

In this embodiment, the magnet unit 25a is arranged so that the polarity of magnetic poles changes from the N-pole to the S-pole along the transferring direction. On the other hand, the magnet unit 25b is arranged so that the polarity of magnetic poles changed from the S-pole to the N-pole along the transferring direction. Even in cases where the magnet units 25a and 25b are arranged as explained above, at the positions shown in FIG. 6B and FIG. 6C, magnetic flux penetrating the center of the transferring tube 20 is generated, which enables collection of metal (metal pieces M) which are being transferred in the transferring tube 20 by the magnet units 25a and 25b. Also in this embodiment, the magnetic surfaces 26a and 26b of the magnet units 25a and 25b are formed to be flush with the inner surface 21 of the transferring tube to control generation of resistance component due to the arrangement of the magnet units 25a and 25b. The two magnet units 25a and 25b are arranged in the circumferential direction along the periphery of the transferring tube 20. Further, the magnet unit 25a and 25b are arranged so that magnetic poles different in polarity face with each other. Further, magnetic poles different in polarity of a plurality of permanent magnets are arranged in the circumferential direction.

Third Embodiment

Figure 6B:
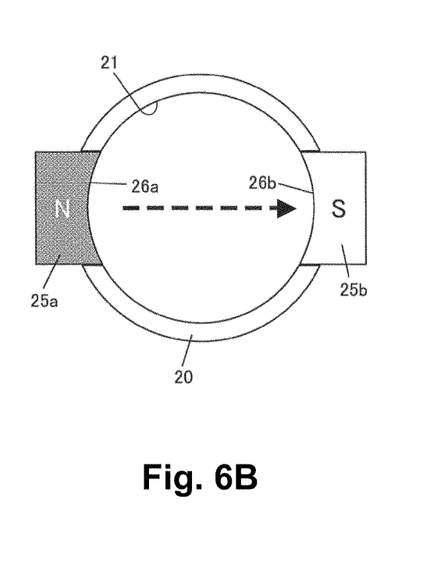
FIG. 6B is the schematic drawing showing another structure of the magnet unit.
Figure 6C:
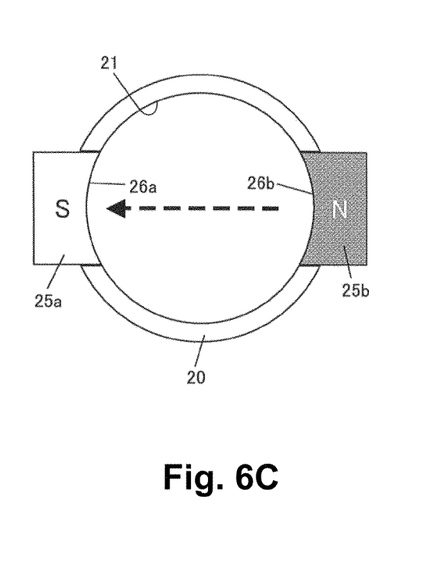
FIG. 6C is the schematic drawing showing another structure of the magnet unit.
Figure 7:
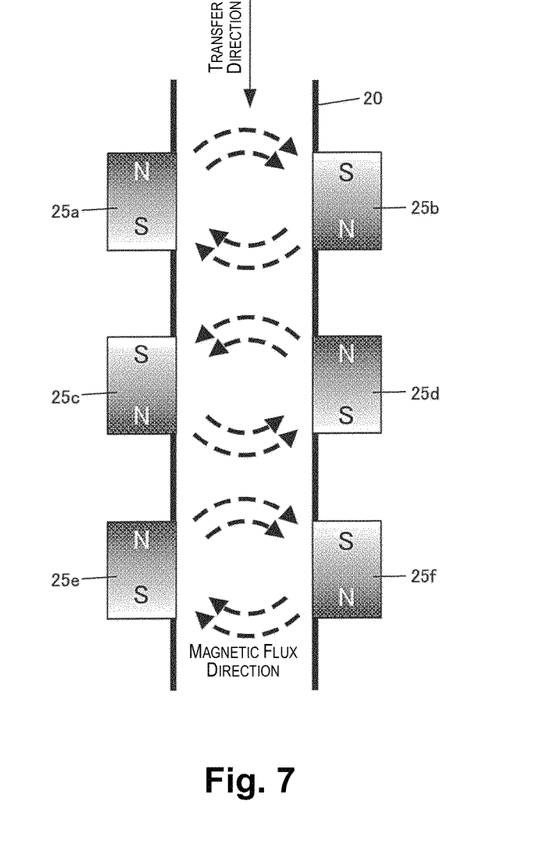
FIG. 7 is a schematic drawing showing another structure of the magnet unit.

In the embodiment of the magnet unit 25 shown in FIG. 7, the pair of magnet unit 25a and 25b in which the polarity of the magnetic poles changes along the transferring direction explained with reference to FIGS. 6A, 6B, and 6C are arranged in plural stages in the transferring direction. FIG. 7 shows a cross-sectional view of the transferring tube 20.

In this embodiment, three pairs of magnet units 25a and 25b, magnet units 25c and 25d, and magnet units 25e and 25f are arranged adjacently along the transferring direction of the transferring tube 20.

By arranging the plurality of magnet units 25a-25f along the transferring direction, the length of the region in which magnetic flux acts on can be substantially extended. Therefore, this improves probability of absorbing metal pieces M which are being transferred in the tube by the magnet units, which in turn makes it possible to improve the efficiency of metal collection. The arrangement of a plurality of magnet units in the transferring direction as mentioned above can also be employed in the arrangement embodiment explained with reference to FIGS. 3A and 3B.

Further, the magnet unit 25a, 25b, 25c, 25d, 25e, and 25f in which the polarity of magnetic pole changes along the transferring direction are arranged so that the arrangement of the N-pope and the S-pole of the adjacent magnet units changes along the transferring direction and via the flow passage. Therefore, in the magnet units adjacent along the transferring direction, magnetic poles having the same polarity are opposed. Further, in the adjacent magnet units arranged vie the flow passage, magnetic poles different in polarity are opposed. In detail, it is constituted such that the pair of magnet units 25a and 25b and the pair of magnet units 25c and 25d are arranged so that the S-poles and the N-poles thereof are opposed, respectively. Further, it is constituted such that the pair of magnet units 25c and 25d and the pair of magnet units 25e and 25f are arranged so that the N-poles and the S-poles thereof are opposed, respectively.

With this, in every pair of magnet units, a repulsive force of the magnetic flux is caused to act on, which enhances the magnetic flux acting on the center of the transferring tube 20 or the vicinity thereof. As mentioned above, by strengthening the magnetic flux acting on the center of the transferring tube 20 or the vicinity thereof, the collection efficiency of metal pieces can be further improved.

Further, in cases where a plurality of magnet units 25a-25f are arranged in the transferring direction like in this embodiment, in the detachment/attachment structure of the magnet units 25a-25f, it is preferably to use the magnet unit fixing tube 27 as explained with reference to FIGS. 5A and 5B. When a plurality of magnet units 25a-25f are fixed to a single magnet unit fixing tube 27, it becomes possible to simultaneously perform detachment and attachment of the plurality of magnet units 25a-25f.

Fourth Embodiment

Figure 8A:
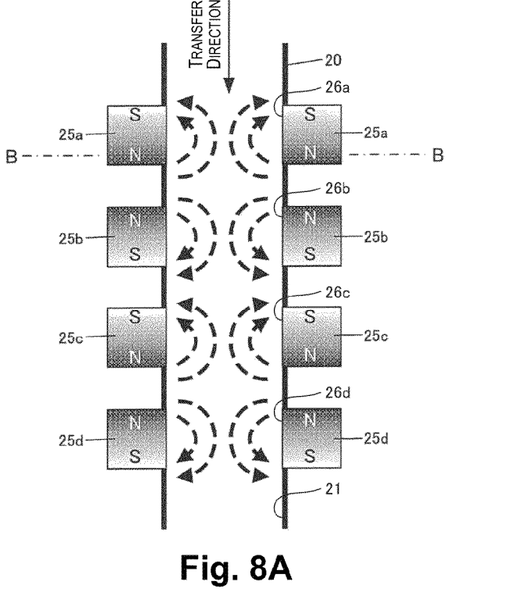
FIG. 8A is a schematic drawing showing another structure of the magnet unit.
Figure 8B:
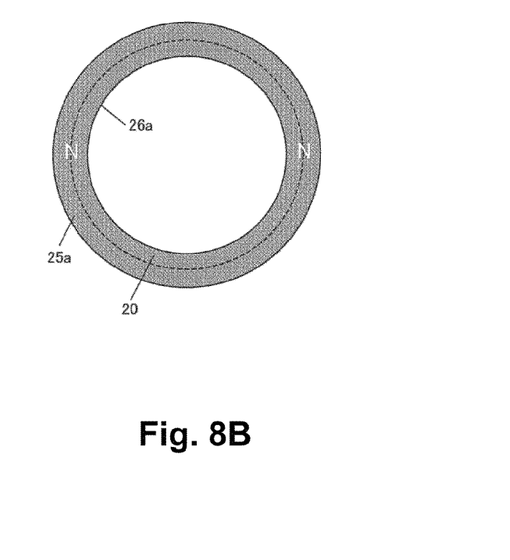
FIG. 8B is the schematic drawing showing another structure of the magnet unit.

The embodiment of the magnet unit arrangement of FIGS. 8A and 8B is different in the shape of the magnet units 25a-25f from the aforementioned embodiment. In the aforementioned embodiment, the magnet unit 25 is formed by a bar magnet. On the other hand, in this embodiment, ring-shaped magnet units 25a-25d are arranged along the transferring direction. FIG. 8A shows a vertical cross-sectional view of the transferring tube 20, and FIG. 8B shows a horizontal cross-sectional view (cross-sectional view taken along the line B-B in FIG. 8A).

In the ring-shaped magnet units 25a-25d, the polarity of magnetic pole changes along the transferring direction. For this reason, in the same manner as in FIG. 7, the magnetic poles arranged adjacently along the transferring direction are arranged to have the same polarity of magnetic pole, which enables enhancement of the magnetic flux acting on the center of the transferring tube 20 and the vicinity thereof. In this embodiment, at the arrangement places of the magnet units 25a-25d, the inner surface is formed only by the magnetic surfaces 26a-26d, but the magnetic surfaces are arranged so as to flush with the inner surface 21 of the transferring tube in the transferring direction.

Fifth Embodiment

Figure 9A:
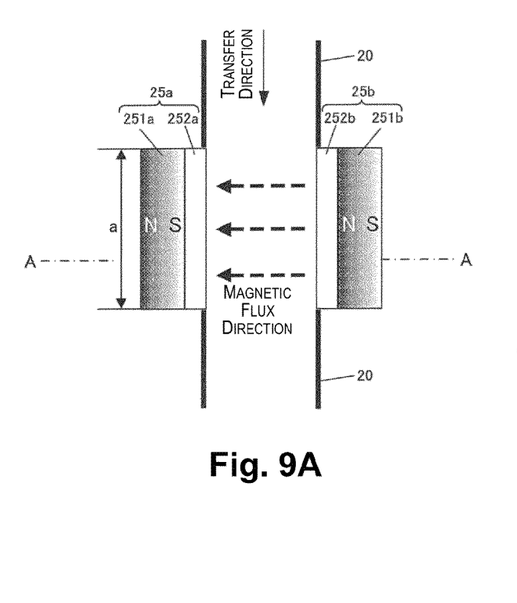
FIG. 9A is a schematic drawing showing another structure of the magnet unit.
Figure 9B:
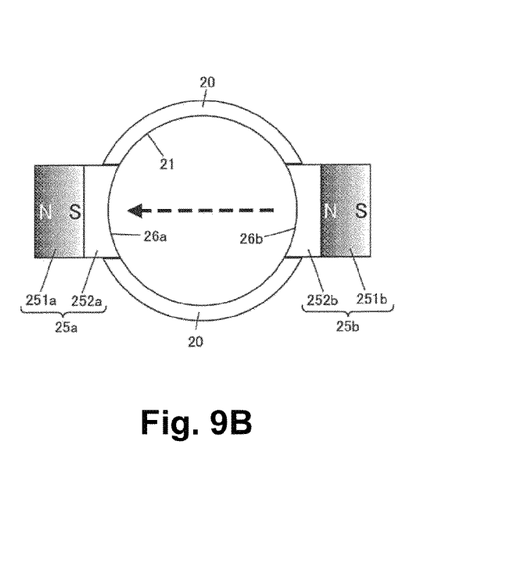
FIG. 9B is the schematic drawing showing another structure of the magnet unit.

The embodiment of the magnetic unit shown in FIGS. 9A and 9B, the structure of the magnet units 25a and 25b is different from the aforementioned first embodiment. In the aforementioned first embodiment, the magnet unit is constituted by a permanent magnet. On the other hand, the magnet unit 25a of this embodiment is constituted by a combination of a permanent magnet 251a and a magnetic material 252a, and the magnet unit 25b of this embodiment is constituted by a combination of a permanent magnet 251b and a magnetic material 252b. FIG. 9A shows a vertical cross-sectional view of the transferring tube 20, and FIG. 9B shows a horizontal cross-sectional view (cross-sectional view taken along the line A-A of FIG. 9A) of the transferring tube 20.

The magnetic surfaces 26a and 26b of the magnet units 25a and 25b are required to be flush with the inner surface 21 of the transferring tube, or to be formed into a configuration corresponding to the inner surface 21 of the transferring tube. In order to form the permanent magnet into such a configuration, it is required to prepare molds same in configuration, etc., which is costly and takes a trouble. However, by using the magnetic materials 252a and 252b of metal, etc., it becomes possible to easily create the magnetic surfaces 26a and 26b corresponding to the inner surface of the transferring tube 20. The arrangement of the permanent magnets 251a and 251b in this fifth embodiment is the same as the arrangement of the permanent magnets 251a and 251b in the first embodiment. 252a and 252b can be a member which allows passage of magnetic force in place of a magnetic material. Even in such a case, the surface of the member 252a and 252b which allows passage of a magnetic force can absorb metal pieces. For this reason, even in such a member, the surface which absorbs metal is deemed to be a magnetic surface 26a and 26b.

Sixth Embodiment

Figure 10A:
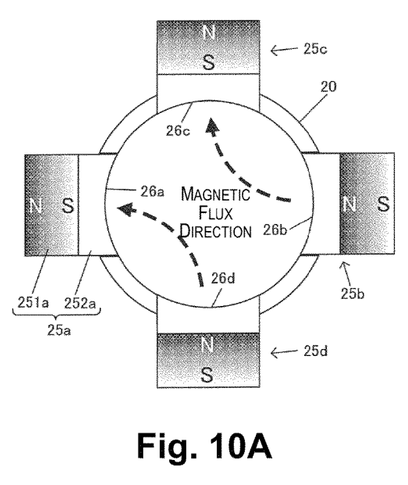
FIG. 10A is a schematic drawing showing another structure of the magnet unit.
Figure 10B:
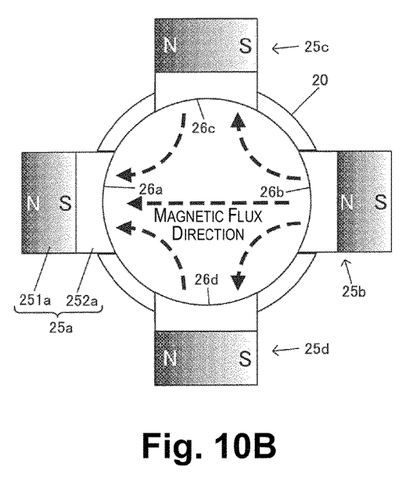
FIG. 10B is a schematic drawing showing another structure of the magnet unit.

The embodiment of the magnetic unit shown in FIGS. 10A and 10B is an embodiment in which the magnet units 25a and 25b explained with reference to FIGS. 9A and 9B are arranged so as to face the inside of the transferring tube 20. On the other hand, in this embodiment, it is constituted such that two pairs of magnet units each formed by combining a permanent magnet and a magnetic material (a total of four magnet units 25a-25d) are arranged in the same cross-sectional surface. FIGS. 10A and 10B show cross-sectional views of the transferring tube 20.

For example, as shown in FIG. 10A, a case in which a first pair constituted by the magnet units 25a and 25b shown in FIGS. 9A and 9B and a new second pair constituted by new magnet units 25c and 25d are arranged will be considered. The first pair and the second pair are arranged such that the second pair is arranged in a manner rotated by 90° from the first pair about the center of the transferring tube 20 as a center point. In such a case, as shown by the broken arrow in figures, it is considered that the magnetic flux does not act on the center of the transferring tube 20 and thereabout, which causes deterioration of collection efficiency of metal.

For this reason, in this embodiment, as shown in FIG. 10B, the magnet units 25a and 25b which constitutes the first pair is arranged in the same manner as shown in FIG. 10B, and the magnet unit 25d which constitutes the second pair is arranged so that the polarity of the magnetic pole changes in the circumferential direction of the transferring tube 20. Further, these magnet units 25c and 25d are arranged so that the magnetic poles of the same polarity are opposed with each other. By arranging the first pair and the second pair of magnet units 25a-25d as explained above, the magnetic flux density is increased than the case shown in FIG. 10A, and the magnetic flux extending from the magnet unit 25b to the magnet unit 25a acts on the center of the transferring tube 20 and the vicinity thereof, to thereby improve collection efficiency of metal.

Seventh Embodiment

Figure 11:
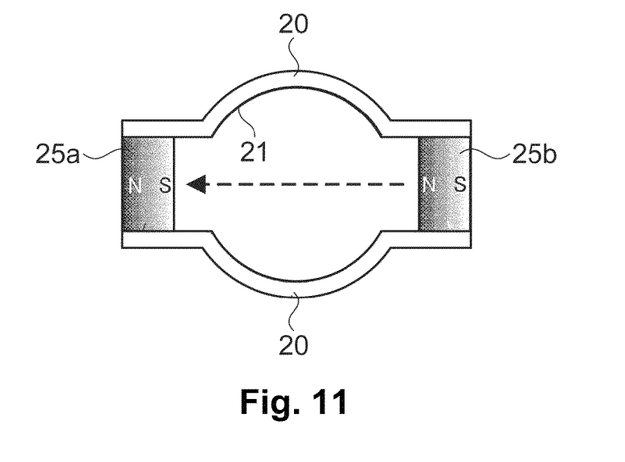
FIG. 11 is a schematic drawing showing another structure of the magnet unit.

The embodiment of the magnet unit shown in FIG. 11 is a modified example of the permanent magnet arrangement of each embodiment. FIG. 11 shows a modified example of FIG. 3B, but can also be applicable to other embodiments. In FIG. 11, the magnet surfaces of the magnet units 25a and 25b are arranged outside the inner surface 21 of the transferring tube 20. In other words, the magnetic surfaces of the magnet units 25a and 25b are not protruded inner than the inner surface of the transferring tube 20. Even in this case, it is possible to stably supply stock material. Further, as compared with the structure in which the inner surface is flush with the inner surface 21 of the transferring tube, it is easier to produce and it becomes possible to reduce the cost.

In this specification, various embodiments are explained, but it should be noted that embodiments constituted by arbitrarily combining the structure of each embodiment also fall within the scope of the present invention.

According to the aforementioned embodiments, the following effects can be obtained.

The magnet unit 25 is arranged at the transferring tube 20 through which stock material Pu is transferred to the defibrating unit 30. In cases where metallic foreign substances such as clips, staples, etc., are mixed in stock material Pu and they are transferred to the transferring tube 20, these metallic foreign substances are absorbed by the magnet unit 25 and become removable. Further, mixing of the metallic foreign substances in the defibrating unit 30 can be prevented, which in turn can prevent deterioration of a blade of the defibrating unit 30 and/or generation of abnormal noise due to the collision of the metallic foreign substances against the blade. Further, the magnetic surface of the magnet unit 25 is arranged so as to not protrude toward the inside of the transferring tube 20. For this reason, there exists no resistance portion in the transferring tube 20, which enables steady supply of stock material Pu to the defibrating unit 30.

The present invention is not limited to the aforementioned embodiments, and various modifications and/or alternations can be added to the aforementioned embodiments. Modified examples will be explained below.

In the aforementioned embodiments, the magnet unit 25 is arranged at the transferring tube 20 through which stock material Pu is transferred to the defibrating unit 30, but not limited to this structure. Further, a magnet unit 25 can be arranged in the transferring tube 35 between the defibrating unit 30 and the cyclone 40. With this, for example, metallic foreign substances mixed in the defibrating unit 30 can be removed before being introduced into the cyclone 40, which can further improve the removal efficiency of metallic foreign substances.

The sheet according to the aforementioned embodiment mainly denotes a member including fibers such as used paper or a pure pulp and formed from materials to which clips, staplers, etc., can be used into a sheet shape, but not limited to it, and can be a board shape, a web shape, or a shape having irregularities. Further, as the stock material, it can be a plant fiber of cellulose, etc., a chemical fiber of PET (polyethylene terephthalate), polyester, etc., or an animal fiber such as wool, silk, etc. The sheet in this application can be divided into paper and nonwoven fabric. Paper can be in a thin sheet like manner, etc., and includes recording paper used for writing or printing, wallpaper, wrapping paper, colored paper, Kent paper, etc. Nonwoven fabric can be thicker than paper or lower in strength, and includes a nonwoven fabric, a fiber board, tissue paper, kitchen paper, a cleaner, a filter, a liquid absorbing material, a sound absorber, a cushioning material, mat, etc.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A sheet manufacturing apparatus comprising:
   a defibrating unit configured to defibrate stock material in a dry process;
   a transferring tube configured to transfer to the defibrating unit the stock material to be defibrated at the defibrating unit; and
   a magnet unit arranged relative to the transferring tube such that a magnetic surface is exposed to an inside of the transferring tube without being protruded inner than an inner surface of the transferring tube.

2. The sheet manufacturing apparatus according to claim 1, wherein
   the magnet unit includes a plurality of magnets arranged in a circumferential direction of the transferring tube.

3. The sheet manufacturing apparatus according to claim 2, wherein
   the plurality of the magnets are arranged such that magnetic poles different in polarity are opposed with each other.

4. The sheet manufacturing apparatus according to claim 2, wherein
   the plurality of the magnets are arranged such that magnetic poles different in polarity are arranged in the circumferential direction.

5. The sheet manufacturing apparatus according to claim 2, wherein
   the plurality of the magnets are arranged in a transferring direction of the stock material in the transferring tube.

6. The sheet manufacturing apparatus according to claim 1, wherein
   the magnet unit is attachable to and detachable from the transferring tube.

7. The sheet manufacturing apparatus according to claim 1, wherein
   the magnet unit and a portion of the transferring tube is detachable from another portion of the transferring tube.

8. The sheet manufacturing apparatus according to claim 1, wherein
   the magnetic surface of the magnet unit is flush with the inner surface of the transferring tube.

9. The sheet manufacturing apparatus according to claim 1, wherein
   the magnetic surface of the magnet unit is positioned outer than the inner surface of the transferring tube.

\* \* \* \* \*